Sept. 19, 1933.    R. D. McINTOSH    1,927,464
COMPRESSION COUPLING
Filed Aug. 4, 1930

INVENTOR:
Robert D. McIntosh
BY John Howard McElroy
his ATTORNEY.

Patented Sept. 19, 1933

1,927,464

UNITED STATES PATENT OFFICE 1,927,464

COMPRESSION COUPLING

Robert D. McIntosh, River Forest, Ill., assignor to The Imperial Brass Manufacturing Company, Chicago, Ill., a corporation of Illinois Application August 4, 1930. Serial No. 472,978

6 Claims. (Cl. 285—166)

My invention is concerned with compression couplings designed primarily for use with small copper tubing, and is intended to produce a coupling that shall have a longer life when used where subjected to severe vibration, as in aeroplanes, automobiles, etc.

To this end it consists of three main features, the first of which is the designing of the outer surface of the acutely tapered end of the male member of the coupling so that when it is forced into place it does not enter and deform the adjacent portion of the tubing, thereby tending to crystallize the copper and thus cause it to fracture more quickly on account of the vibration to which it is subject in use.

The second feature is applicable only to a coupling of the type wherein the tapered end of the male member is connected to the body by a frangible or fragile portion that ruptures as soon as the tapered end is forced into place so that it does not rotate at that time and tend to crystallize the copper tubing adjacent it. This feature consists in forming a reduced or fragile portion in part or entirely by an internal groove so that when the rupture occurs the roughened ruptured portion does not contact with and possibly weaken the copper tubing.

The third feature consists in placing in the outer end of the male member a sleeve of soft rubber or some similar material whose internal diameter is slightly less than the external diameter of the tube passing therethrough so that the latter is cushioned, and vibration at that point prevented.

Figure 1:
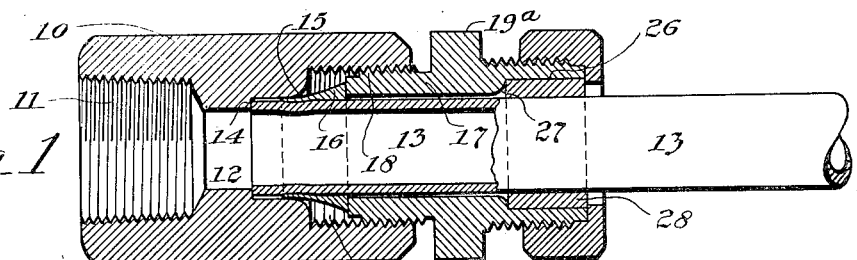
Figure 2:
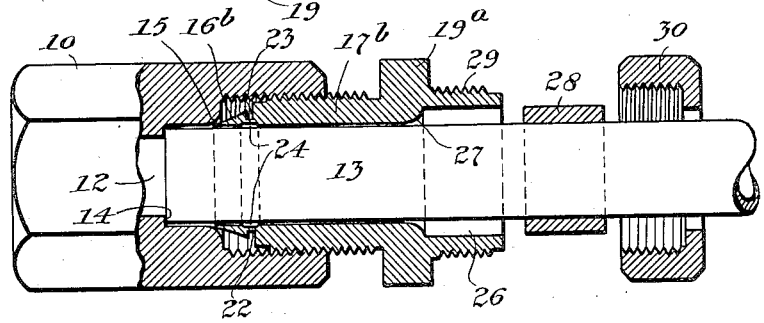
Figure 3:
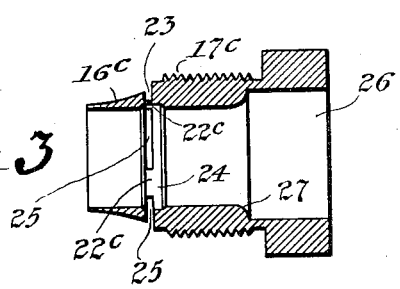

To illustrate my invention, I annex hereto a sheet of drawings in which the same reference characters are used to designate identical parts in all the figures of which Fig. 1 is a vertical section of a coupling embodying my invention with the parts in place;

Fig. 2 is a similar view but with the parts incompletely assembled to show their construction prior to the final completion of the assembly; and Fig. 3 is a sectional view of the male member alone showing a still different specific form.

In illustrating my invention I have shown it as applied to a coupling comprising the female member 10 which may have the internal threaded portion 11 for connection to any desired object, the right hand end of the same being shown as constructed to embody my invention. The member 10 may be hexagonal in its external cross section, as shown for convenience in applying a wrench. It preferably has the passage 12 of substantially the internal diameter of the tube 13 adapted to be coupled thereto, and the smallest portion of this passage preferably terminates in the square shoulder 14 against which the end of the tube 13 abuts when the parts are assembled. Beyond this shoulder is placed an abutment 15 which is convex in cross section, and is adapted to co-operate with the concave outer surface of the tapered end 16 of the male member, which tapered end may be detached, as in the form shown in Figs. 1 and 3, or initially secured to said body by a frangible portion as illustrated in Figs. 2 and 4. In Fig. 1 the acutely tapered end 16 is illustrated as having its outer end flat in a plane at right angles to the axis of the tube and co-operating with a similar inner end of the male member proper 17, which has the externally threaded portion 18 to co-operate with the internally threaded portion 19 of the female member, the male member also having the larger portion 19$^a$, preferably hexagonal in cross section for convenience in applying a wrench in assembling the device.

In the form shown in Fig. 2, the tapered end 16$^b$ is connected to the body of the male member 17$^b$ by a very thin web 22 which is preferably formed by cutting a comparatively narrow, deep channel 23 in the outer face of said tapered end and also by cutting on the inner face directly opposite thereto the shallower channel 24. Where the tubing is of small size, a sufficiently frangible web 22 can be formed in this manner, but where the tube is of considerable diameter, necessitating a large size for the male member 17$^c$, the acute tapered end 16$^c$ has its frangible portion preferably formed by the same external groove 23 and opposed internal groove 24, and the body of metal constituting this web 22$^c$ is still further reduced by sawing through the web so as to cut therein three or more slots 25, so that the two parts are connected only by the three or more small portions 22$^c$ which is all that is left of the initial web.

The operation of my improved coupling as so far described, will be readily apparent. When the male member is screwed in place, the concavity of the outer surface of the tapered end 16 co-operating with the convex shoulder 15 produces a resistance to the movement of the outer portion of the tapered end that does not exist to the same extent with the inner portion, and as a result the acute end tends to curl outward, as it were, and does not enter and deform the soft copper tubing 13, but is brought in contact therewith, as shown in Fig. 1, tightly enough to make a fluid tight joint without any action tending to crystallize and weaken the tubing. The concavity of the tapered end 16 co-operating with the convexity of the shoulder especially toward the end of the screwing in the male member, produces a resistance that tends to cause the turning of the male member to be stopped before there can be sufficient compression of the tapered sleeve to cause it to deform materially the copper tubing. That the advantage of the simple change constituting my invention is substantial and material, is shown by the fact that my coupling, properly installed, when subjected to a vibration test, stands up for five times as long as the best similar couplings heretofore known.

It will be understood that where the tapered ends 16 and 16a are employed, initially separated from the male members 17 and 17a, they are so initially separated for the purpose of preventing the turning of the tapered ends 16 and 16a after they come in contact with the shoulder 15, as continued turning during the assembly tends to crystallize the tubing 13 directly beneath the tapered end and thus weaken the same.

In the form shown in Figs. 2 and 3, the same result is secured by reason of the fact that as soon as a substantial resistance to the turning of the tapered ends 16b and 16c is produced by their contact with the shoulder 15, the frangible portion breaks and the tapered end ceases to rotate despite the continued rotation of the body of the male member, which continues to force said tapered end into position without any further rotation. The formation of the frangible portion by employing the internal groove 24 produces a result superior to that which is secured by having merely an outward groove 23. When this form is employed, and the male member is screwed home and the tapered end 16b or 16c breaks off and stops its further rotation, none of the fin produced by the fracture can reach the tubing and consequently dig into it and deform it during the continued rotation of the male member until the joint is made as tight as is desirable.

As an additional feature of my invention, I may form in the outer end of the male member an enlarged portion 26 of the passage therethrough, which enlarged portion is connected to the adjacent smaller portion by the curved abutment 27. Within this enlarged portion 26 I may place the soft rubber sleeve 28 which is preferably of internal diameter slightly less than the external diameter of the tube 13 and of an external diameter of the size to fit snugly in the enlarged portion 26. The use of this rubber sleeve 28 tends to stop any possible vibration of the tube where it passes through the sleeve, and prevents any vibration occurring further in the coupling where the actual liquid-tight seal or connection is made. While this sleeve 28 might be merely fitted in the end of the male member, as seen in Fig. 3, I preferably employ in addition to the form shown in Fig. 3, the externally threaded extension 29, upon which is screwed the nut 30 employed for this purpose, and by the use of this nut, I may put sufficient pressure on the sleeve 28 so as to compress the same longitudinally and cause it to fit more tightly in the enlarged portion 26 of the passage through the male member.

While I have shown and described my invention as embodied in the form which I at present consider best adapted to carry out its purposes, it will be understood that it is capable of modification, and I do not desire to be limited in the interpretation of the following claims except as may be necessitated by the state of the prior art.

What I claim as new and desire to employ by Letters Patent of the United States, is:

1. As a new and useful article of manufacture, a male tube coupling member having three portions; one by which it is adapted to be turned; another a threaded portion; and finally a portion acutely tapered to co-operate with the distorting shoulder on a female member when applied thereto, said acutely tapered portion being connected to the threaded portion by a fragile portion adapted to be broken during said application, there being an internal annular groove formed where the acutely tapered portion is connected to the threaded portion, which groove prevents any fin that may be formed by the breaking from reaching the tube to be coupled and cutting it as the threaded portion is rotated after the tapered portion has been broken off.

2. As a new and useful article of manufacture, a male tube coupling member having three portions; one by which it is adapted to be turned; another a threaded portion; and finally a portion acutely tapered to co-operate with the distorting shoulder on a female member when applied thereto, said acutely tapered portion being connected to the threaded portion by a fragile portion adapted to be broken during said application, said fragile portion being formed by opposed internal and external annular grooves formed where the acutely tapered portion is connected to the rest of the male member, the internal groove serving to prevent any fin that may be formed by the breaking from reaching the tube to be coupled and cutting it as the threaded portion is rotated after the tapered portion has been broken off.

3. As a new and useful article of manufacture, a male tube coupling member having three portions; one to which a wrench can be applied; another a threaded portion; and finally an acutely tapered portion adapted to be compressed by a shoulder on a female member when applied to a pipe and connected to the threaded portion by a fragile portion including an internal annular groove formed therein, which groove prevents any fin that may be formed when the tapered portion is broken off from reaching the tube to be coupled and cutting it as the threaded portion is rotated after the tapered portion has been broken off.

4. As a new and useful article of manufacture, a male tube coupling member having three portions; one to which a wrench can be applied; another a threaded portion; and finally an acutely tapered portion adapted to be compressed by a shoulder on a female member when applied to a pipe and connected to the threaded portion by a fragile portion caused by opposed internal and external annular grooves formed therein, the internal groove serving to prevent any fin that may be formed by the breaking from reaching the tube to be coupled and cutting it as the threaded portion is rotated after the tapered portion has been broken off.

5. In a compression coupling, the combination with a female member, of a pipe adapted to enter the same, a non-elastic male member embracing the pipe and having snugly fitted therein an elastic sleeve whose internal diameter is slightly less than the external diameter of the pipe, said members having cooperating surfaces acting to make a tight coupling with the pipe when assembled, and a non-elastic nut screwed on the male member and engaging the end of the elastic sleeve to compress it longitudinally and cushion vibrations transmitted to the tube at this point.

6. As a new and useful article of manufacture, a non-elastic male pipe-coupling member having means whereby it can be forced into place and a tapered portion effective in forming the coupling, and having snugly fitted therein an elastic sleeve whose internal diameter is slightly less than the external diameter of the pipe, and a non-elastic nut screwed on the male member and engaging the end of the elastic sleeve to compress it longitudinally and cushion vibrations transmitted to the tube at this point.

ROBERT D. McINTOSH.